Feb. 16, 1971  L. C. YOUNGBLOOD  3,562,861
TIRE MOLD WITH REMOVABLE INSERTS
Filed Jan. 14, 1969  2 Sheets-Sheet 1
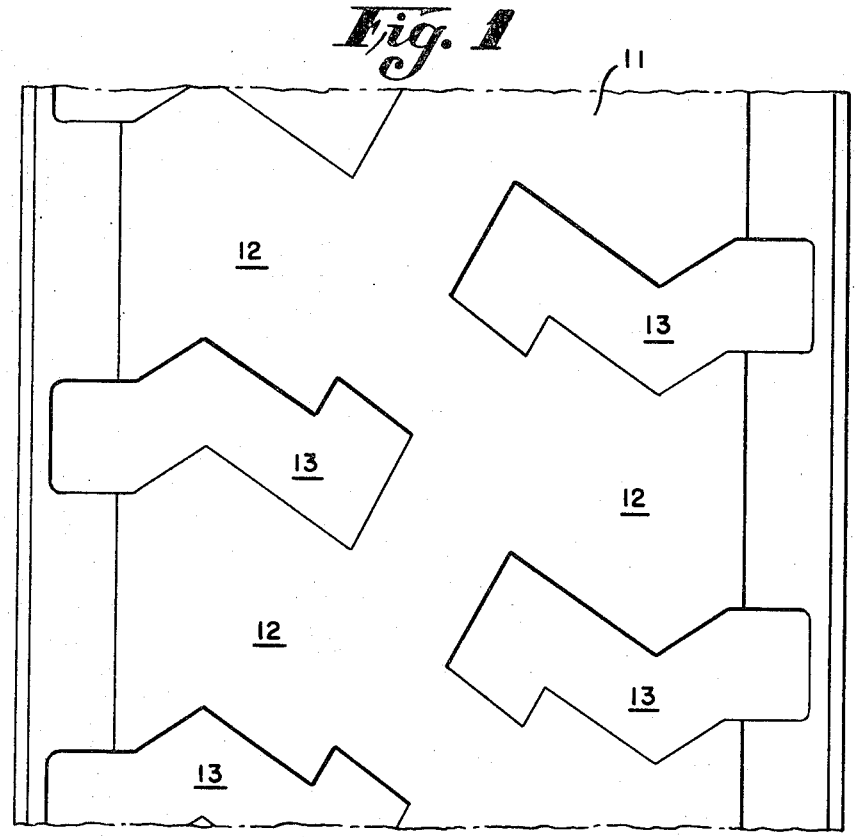
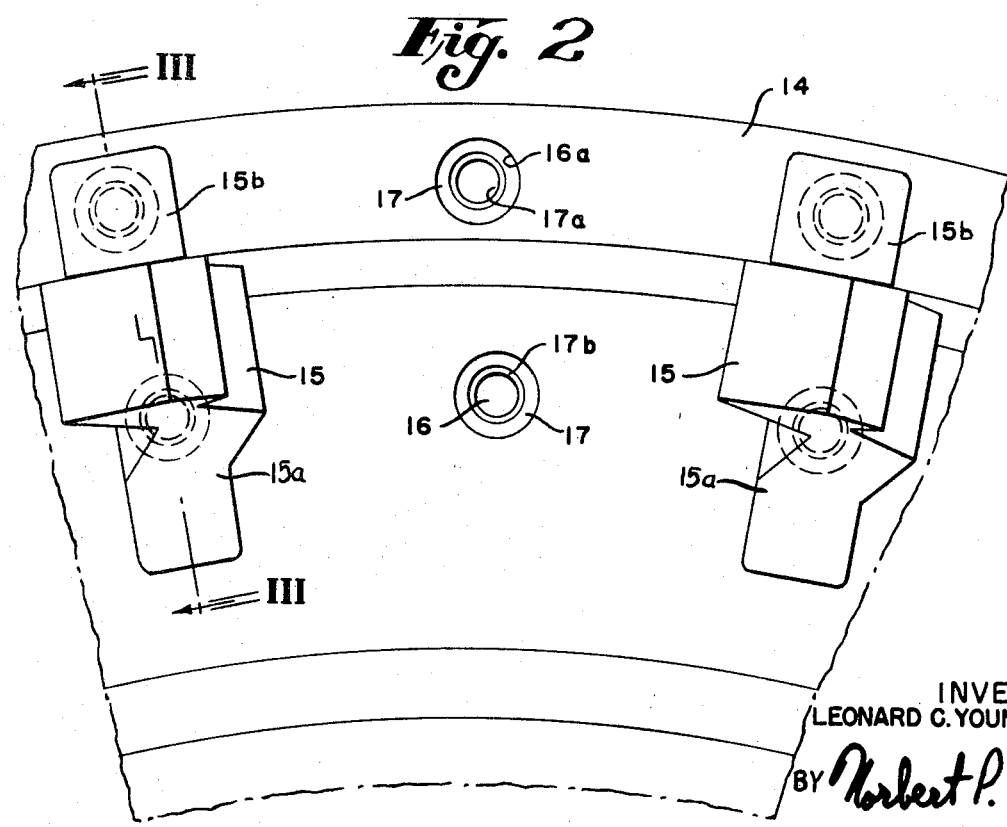
INVENTOR.
LEONARD C. YOUNGBLOOD
BY Norbert P. Holler
ATTORNEY.

Feb. 16, 1971 — L. C. YOUNGBLOOD — 3,562,861
TIRE MOLD WITH REMOVABLE INSERTS
Filed Jan. 14, 1969 — 2 Sheets-Sheet 2
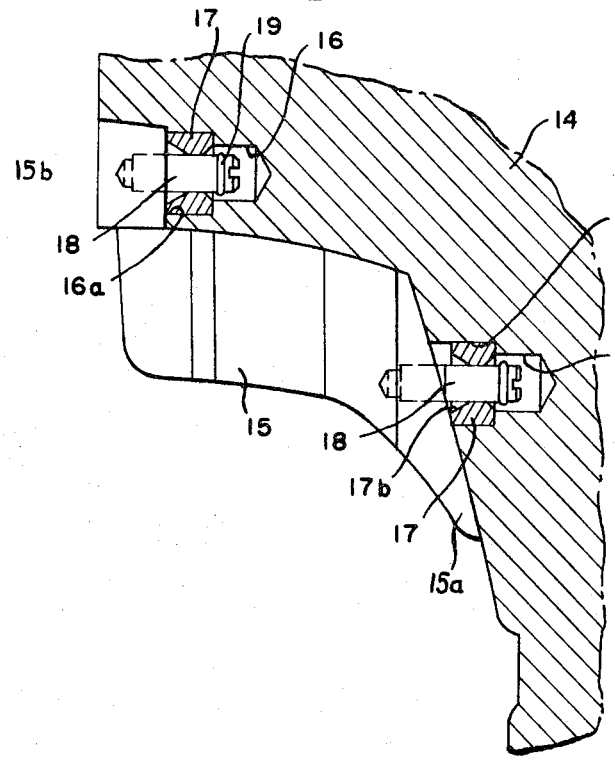
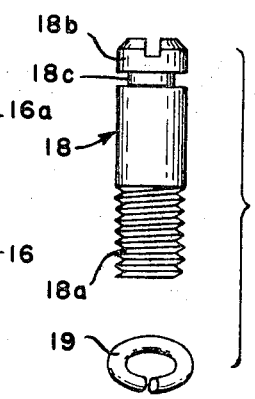
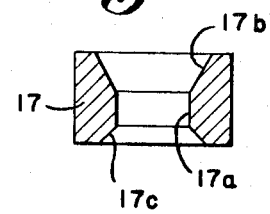
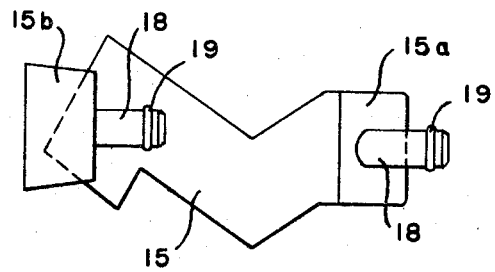
INVENTOR.
LEONARD C. YOUNGBLOOD
BY Norbert P. Holler
ATTORNEY.

United States Patent Office 3,562,861
Patented Feb. 16, 1971

3,562,861
TIRE MOLD WITH REMOVABLE INSERTS
Leonard C. Youngblood, Grosse Pointe Park, Mich., assignor to Uniroyal, Inc., New York, N.Y., a corporation of New Jersey
Filed Jan. 14, 1969, Ser. No. 790,936
Int. Cl. B29c 1/00; B29h 5/02
U.S. Cl. 18—44                                  6 Claims

ABSTRACT OF THE DISCLOSURE

A tire mold with releasably mounted inserts such as tread lug-forming design elements is disclosed, for use in the manufacture of large size tires which are characterized by the presence of deep, multiple angle cross lug grooves and thus are difficult to remove from the mold. The inserts are provided with parallel projecting split ring-collared pins adapted to be snapped into and out of suitable retainer bushings fixed in the mold. When the press is opened at the end of a cure cycle for ejection of the tire from the mold, the mounting pins are pulled out of the bushings while the inserts remain attached to the tire, from which they can later, preparatory to reuse, be individually extracted without tearing or otherwise damaging the lugs.

---

This invention relates to the art of manufacturing tires, and in particular to a tire mold construction therefor.

In the manufacture of large size tires with tread surfaces characterized by the provision of relatively wide and high cross lugs separated by relatively deep traction-enhancing grooves, it is found that it is extremely difficult to remove such a tire from a standard mold, when the same is opened at the end of the cure cycle, without causing damage to the lugs by severe distortion thereof, since the relative movement between the tire and the mold does not take place radially of the tire, and since the flexibility of the tread of such a large size tire is inherently relatively limited. The problem becomes still more acute if the configuration of the grooves is multiple angle or zigzag in nature, and/or if the tire is a radial tire, especially in the latter case because the tread-reinforcing breaker or belt then limits the flexibility of the tread even more so than usual.

It is an object of the present invention, therefore, to provide a novel tire mold construction for use in large size, deep groove tire production, which enables the problem of difficult removal of such tires from the mold to be efficaciously overcome.

A more specific object of the invention is the provision, in such a tire mold construction, of tread lug-forming design elements or inserts which can be simply and efficiently secured in place in the mold for ready releasability therefrom when the mold is being opened.

Generally speaking, the objectives of the present invention are achieved by the provision of a tire mold construction of the class referred to in which the tread lug-forming inserts or design elements are releaseably mounted interiorly of the mold in such a manner that, when the mold is opened at the end of a cure cycle, the said inserts become disconnected from the mold and remain attached to the tire tread, from which they can later be removed at will and without any risk of damage to the tire.

The foregoing and other objects, characteristics and advantages of the present invention will be more clearly understood from the following detailed description thereof when read in conjunction with the accompanying drawings, in which:

FIG. 1 is a plan view of a portion of a large size, deep groove tire produced in a mold according to the present invention;

FIG. 2 is an elevational view of a portion of the interior of a tire mold used in producing the tire shown in FIG. 1 and having tread lug-forming design elements according to the present invention inserted therein, one element being removed to show additional details;

FIG. 3 is a fragmentary sectional view taken along the line III—III in FIG. 2, the mold insert and its mounting adjuncts being shown in elevation;

FIG. 4 is a plan view of the tread lug-forming design element according to the present invention when removed from the mold;

FIG. 5 is an exploded elevational view, on an enlarged scale, of a mounting pin assembly for such a tread design element, one part of the assembly being shown in perspective; and FIG. 6 is an axial section, also on an enlarged scale, through a retainer bushing for such a mounting pin.

Referring now to the drawings in greater detail, there is illustrated in FIG. 1 a large size tire 10, for example an off-the-road tire, which has a tread 11 characterized by a plurality of generally transversely extending, zigzag-shaped lugs 12 arranged essentially in two circumferential rows at the opposite sides of the tire and separated from one another by wide and deep correspondingly shaped multiple angle grooves 13. Such grooves may be as much as 4 inches or more deep, depending on the size of tire involved, and are defined where the mold is provided with correspondingly shaped internal ribs or like projecting design elements. As is well known, the opening of such a mold to permit the tire to be removed from the mold atter a curing operation, generally takes place in the axial direction of the tire. Where the mold has fixed internal tread design elements, however, the opening of the mold is extremely difficult at best even if the flexibility of the tread is intrinsically unencumbered, and in the case of a radial, belted tire with a relatively inflexible tread it becomes practically impossible without seriously distorting and even tearing the lugs 12.

In accordance with the present invention, this drawback is effectively overcome by the provision of a mold 14 having tread design elements 15 of the desired configuration releasably secured to the mold interiorly thereof. To this end, according to a preferred aspect of the invention, the mold is provided in its inner surface with a plurality of appropriately located pairs of counterbored recesses 16–16a oriented parallel to the mold axes (FIGS. 2 and 3). In the large diameter section 16a of each of these recesses is securely mounted in any suitable manner, as by being pressfitted thereinto, a respective retainer bushing 17 (FIGS. 3 and 6). Each such bushing is provided with a central passageway which has a narrowest cylindrical middle section 17a and two conically flaring end sections 17b and 17c extending outwardly from the opposite ends of the middle section. Merely by way of example, tapers of the surfaces defining the two end sections 17b and 17c which have been found to be adequate are angles of 30° and 45°, respectively, with the axis of the bushing.

Concomitantly, each mold insert or tread design element 15 is provided on the buttress groove-forming portion 15a thereof and on a separate end extension 15b (FIGS 2 to 4) with a respective pair of mounting pins 18. For ease of manufacture and assembly, these pins are preferably in the form of screw bolts (see FIG. 5), being partly threaded at one end region, as shown at 18a, and provided at the other end with a head 18 slotted to receive the bit of a screw driver or like tool, to enable their being screwed into correspondingly internally threaded recesses in the said parts of the mold inserts. Each pin 18 is further provided adjacent the head end thereof with a peripheral groove 18c into which a spring steel split ring 19 is fitted. The diameters of the pins 18 are slightly, for example 1/64 inch, less than those of the middle sections 17a of the through-bores or passageways in the bushings 17 to permit the pins to extend smoothly slidably therethrough, while the split rings 19 are constructed to have an outer diameter equal to that of the pins when compressed and slightly, for example 1/64 inch, greater than that of the bushing passageway sections 17a when free.

It will be understood, therefore, that in order to mount the tread design elements or inserts 15 in the mold, the pins 18 of each insert are pressed into a respective pair of the retainer bushings 17. During the insertion, the walls defining the inwardly tapering sections 17b of the various passageways exert a camming action and cause the split rings 19 to be compressed into their respective grooves 18c so as to permit the ring-bearing portions of the pins to pass through the middle sections 17a of the bushings, upon completion of which passage the rings expand again to retain the inserts in place. The inserts are thus securely and properly mounted in the mold, i.e., with no freedom of lateral movement, for the curing operation.

Upon subsequent opening of the mold, the resistance to angular or transverse movement of the tread design elements 15 in the respective tread grooves of the cured tire will be greater than the resistance of the split rings 19 to compression, whereby upon relative movement between the bushings and the pins (in one case essentially due to the movement of the upper mold half away from the tire, and in the other case essentially due to the movement of the tire away from the lower mold half), the walls defining the tapered sections 17c of the various bushing passageways will exert a camming action and cause the split rings to be compressed and permit withdrawal of the pins from the bushings. Once the tire is completely removed from the mold, of course, the inserts 15 can be readily extracted from the tread grooves by being drawn linearly away from the tread radially of the tire. Any risk of damaging the tire by the opening of the mold is, consequently, effectively eliminated.

It will be understood that the foregoing description of a preferred embodiment of the present invention is for the purpose of illustration only, and that the various structural and operational features herein disclosed are susceptible to a number of modifications and changes none of which entails any departure from the spirit and scope of the present invention as defined in the hereto appended claims. Thus, other variable width means than split rings, e.g., ball and other types of catches, could be used as the snap fasteners for the mold inserts, and if such a snap fastener includes male and female elements, the disposition thereof may be the reverse of that shown, i.e., the male fastener elements may be adjuncts of the mold and the female elements adjuncts of the inserts.

Having thus described the invention, what I claim and desire to protect by Letters Patent is:

1. A tire curing apparatus, comprising a mold half having tire surface design-forming inserts located interiorly thereof, one of said mold half and inserts being provided with a plurality of recesses oriented parallel to the mold axis, the other of said mold half and inserts being provided with mounting members projecting parallel to the mold axis each adapted to fit into a respective one of said recesses, and cooperable means on said mounting members and in said recesses for releaseably retaining said inserts in place in the mold, said cooperable means being constructed to provide mounting member-retaining forces which are less than the forces required to separate said inserts from the tire surface during opening of the mold at the end of a curing operation.

2. Apparatus according to claim 1, wherein said cooperable means are snap fastening means.

3. Apparatus according to claim 1, said recesses being defined in the interior surface of said mold half, and said mounting members being secured to said inserts.

4. Apparatus according to claim 1, said cooperable means compriisng retainer bushings each fixedly seated in a respective one of said recesses, each of said bushings having a through-bore parallel to the mold axis and the width of which is least at the middle section of the bore and increases gradually toward the opposite ends thereof, the width of the body of each of said mounting members being slightly less than that of said middle section of the bore intended to receive that mounting member, and each of said mounting members having on the body thereof a variable width portion the width of which is normally greater than, but can be reduced to be equal to, that of said body, whereby upon relative axial movement between said mounting members and said bushings in one sense or the other, said mounting members and therewith said inserts can be effectively snapped into and out of place in the mold half.

5. Apparatus according to claim 4, each of said mounting members comprising a pin having a peripheral groove defined thereon, and said variable width portion of each pin being defined by a resilient split ring seated in the respective groove.

6. Apparatus according to claim 5, said recesses being defined in the interior surface of said mold half, and said mounting pins being secured to said inserts.

References Cited
UNITED STATES PATENTS

| | | | |
|---|---|---|---|
| 1,649,525 | 11/1927 | Herold. | |
| 2,587,297 | 2/1952 | Duerksen | 18—44 |
| 2,658,238 | 11/1953 | Rizzo | 149—96X |
| 2,736,924 | 3/1956 | Bean | 18—44 |
| 2,770,013 | 11/1956 | Crooker | 18—44X |
| 2,779,060 | 1/1957 | Knox | 18—44X |
| 2,808,621 | 10/1957 | Torrey | 18—44X |
| 2,813,304 | 11/1957 | Hawkinson | 18—44X |
| 3,061,880 | 11/1962 | Weisbach | 18—44X |
| 3,199,567 | 8/1965 | Kung et al. | 18—44X |
| 3,283,053 | 11/1966 | Felker | 18—44X |

J. HOWARD FLINT, Jr., Primary Examiner

U.S. Cl. X.R.

18—36; 249—91